P. C. HEWITT.
METHOD OF ELECTRICAL DISTRIBUTION.
APPLICATION FILED JULY 30, 1904.

1,043,104.

Patented Nov. 5, 1912.

WITNESSES:

INVENTOR

BY

ATTORNEY

UNITED STATES PATENT OFFICE.

PETER COOPER HEWITT, OF NEW YORK, N. Y., ASSIGNOR TO COOPER HEWITT ELECTRIC COMPANY, OF NEW YORK, N. Y., A CORPORATION OF NEW YORK.

METHOD OF ELECTRICAL DISTRIBUTION.

1,043,104. Specification of Letters Patent. Patented Nov. 5, 1912.

Application filed July 30, 1904. Serial No. 218,851.

*To all whom it may concern:*

Be it known that I, PETER COOPER HEWITT, citizen of the United States, and resident of New York, in the county of New York and State of New York, have invented certain new and useful Improvements in Methods of Electrical Distribution, of which the following is a specification.

The principal object of my invention is to obtain practically continuous alternating currents of very high frequency with comparatively small variations of intensity of the successive alternations or waves. To effect this object I utilize the high frequency pulsations or alternations which are set up by capacity abruptly discharging through inductance. Such discharge ceases to be oscillatory when $R^2$ is greater than $4\ L/C$, L being the inductance, C the capacity, and R the resistance, all losses whether by friction, conduction, induction, convection, or radiation being reckoned as resistance. Yet in many relations it is almost essential to ultimate purposes and objects that the energy of the condenser discharge be utilized by immediate transfer out of the oscillating circuit. For instance, in wireless telegraphy or telephony if the aerial has large capacity and readily radiates large amounts of energy, the oscillations of a condenser discharge circuit feeding the same, may rapidly weaken to a point where the potential is insufficient to break down the dielectric of the spark gap or equivalent discharge device, and the current soon ceases to oscillate. Moreover, with most such apparatus, there are practical difficulties which limit the rate at which recharge and disruptive redischarge can be effected. In order to meet such conditions and to secure a persistent or continuous high frequency alternating current of the class described, I have arranged a plurality of oscillating circuits adapted to coöperate synchronously and in phase to supply a succession of fresh impulses or discharges at intervals as short as may be necessary to maintain substantial continuity and even uniformity of the high frequency alternating currents or oscillations referred to. I may, of course, arrange matters of proportion and adjustment in such manner as to produce any desired approximation of continuity or uniformity. The broad feature of causing two or more oscillatory circuits to energize the same consumption circuit successively or through different periods, is independent of the nature of the prime source or sources of power, provided only that each oscillatory circuit receives suitable charges of energy at the proper times, and though, as is well known in the art, it is possible to employ for such purposes ordinary direct currents of comparatively low voltage, or even rectified alternating currents of higher voltage, I have made the important discovery that comparatively low frequency alternating, fluctuating, or intermittent currents or charges may be utilized for the prime energy supply, without causing appreciable irregularities or discontinuities in the rate of the prime discharges energizing the radiating or other consumption circuit. I accomplish this by employing a plurality of varying or alternating supply currents wherein the periods of efficient energy output of one supply current are so timed with respect to periods of small or insufficient energy output of another supply current, that the periods of small or insufficient output of one supply may be bridged over by the periods of sufficient energy output of some other supply current or currents. For instance, by utilizing two or more alternating current supplies having a multiphase time relation in connection with capacity circuits to be energized thereby and by causing the resulting discharges to take effect upon a common consumption circuit, the latter may be supplied with fresh energy by prime discharges taking effect successively at approximately uniform intervals, without the intermissions which occur at every zero point of the alternations where a single phase alternating current supply is used. Thus a plurality of fluctuating or alternating currents or pressures of relatively low frequency may be made to furnish fresh energy charges or currents at an extremely high rate.

It will be understood that the expression "consumption circuit" where used in a broad sense is intended to include not only metallic circuits, closed and unclosed, but also any device or field in connection with which the currents may be usefully applied, such as electromagnetic or electrostatic fields, or etheric or other natural or artificial media of propagation.

My invention is capable of greatly varied applications, but its general character will be more readily understood by reference to the specific embodiments shown in the accompanying drawings, wherein—

The primary energy is preferably derived from a multiphase source, which may be a rotating field generator A. The primary energy may be of any desired frequency, as, for instance, 10,000 periods, or a greater or less number, as may be found desirable or consistent with good engineering practice. It will be understood that a frequency of 10,000 periods is a high frequency as compared with frequencies commonly employed for commercial purposes; but is a low frequency as compared with frequencies commonly employed for wireless telegraphy, telephony, or other special purposes.

The source of the primary energy may be of any known or desired type. The coils B, $B^1$, $B^2$, etc., each receive energy at their own particular times. The coils are preferably even in number and symmetrically placed. When thus arranged, the two coils directly opposite each other, as, for instance, B, $B^1$, Fig. 1, receive energy at the same time and so far as concerns the functions of producing a multiplied frequency must be reckoned as one coil if connected in phase, so that with six coils as shown, there are but three available phases. It is of course obvious that the total time period of the rotating field A may be subdivided into any number of periods corresponding to the number of pairs of coils used.

The energy fluxes set up in the coils B, $B^1$, $B^2$, etc., may be utilized as follows: The terminals of the coil B, for instance, are electrically connected through condensers C, $C^1$. The capacity of the condensers C, $C^1$, is then adjusted until the circuit B, C, L, $t$, $L^1$, $C^1$, B is resonant to the desired frequency. The simplest case is where this frequency is the same as that of the rotating field, which, as stated, may be 10,000 periods more or less. The spark gap or other discharge device S is then adjusted across the condensers. The desired adjustment of the discharge device, like that of the condensers and of the various tuning devices, is determined by trial.

I find that in practice I may make adjustment of inductance at L, $L^1$, without greatly disturbing this resonance. Such changes of inductance are made for the purpose of tuning the oscillatory circuit S, C, L, $t$, $L^1$, $C^1$, S to a frequency much higher than the 10,000 frequency of B. This higher frequency in the case of the arrangement of Fig. 1, should preferably be 3, 9, 15, or 21 times the frequency of A, as will be explained. If the slight change of inductance at L and $L^1$ necessary to effect tuning to high frequency, materially affects the resonance of the 10,000 period circuit including B, correction may be made by slight additional adjustment of the condensers C, $C^1$. For convenience, the 10,000 period circuit may be termed BO and that of the higher frequency SO.

All of the circuits, BO and SO, $B^1O^1$ and $S^1O^1$, $B^2O^2$ and $S^2O^2$, $B^3O^3$ and $S^3O^3$, $B^4O^4$ and $S^4O^4$, $B^5O^5$ and $S^5O^5$ are preferably electrical duplicates and are usually tuned and adjusted respectively to the 10,000 frequency of BO and the 30,000 or 90,000 frequency of SO, though it will be evident that the tuning of BO, $B^1O^1$, $B^2O^2$, etc., to the lower frequencies, may be omitted. These circuits which are in a sense independent, are all connected to the terminals of the primary $t$ by the leads 1, 2, so that said primary $t$ is common to all and in series with each. In general, it will be noted that the amount of inductance $LL^1$ in circuit O is somewhat greater than the corresponding inductance in circuits $O^1$, $O^2$, $O^3$, $O^4$, and $O^5$. This is because the latter five circuits include the inductance of the comparatively long connections 1, 2, leading to the primary of the transformer, whereas O is connected almost directly to the primary and the inductance $LL^1$ must be greater in proportion to the lengths of the leads 1, 2.

It is preferable to connect diametrical and therefore simultaneously energized circuits as BO, $B^1O^1$ in phase as in Fig. 1ª and adjacent pairs of coils should be connected oppositely so as to establish the odd number phase relations hereinafter described in connection with Fig. 2. When this is done, after the manner indicated in Fig. 1ª, one oscillation circuit SO may be utilized for both B and $B^1$, the condensers $C^2$, $C^3$, inductance $L^2L^3$ and discharge device S being omitted and $B^1$ connected directly to the terminals of B. The latter arrangement has advantages, for with two circuits SO, $S^1O^1$ in phase as in Fig. 1 there is sometimes a possible tendency for S, $S^1$ to discharge successively as shown in dotted lines in Fig. 4, instead of together as shown in Fig. 2.

Figure 1:
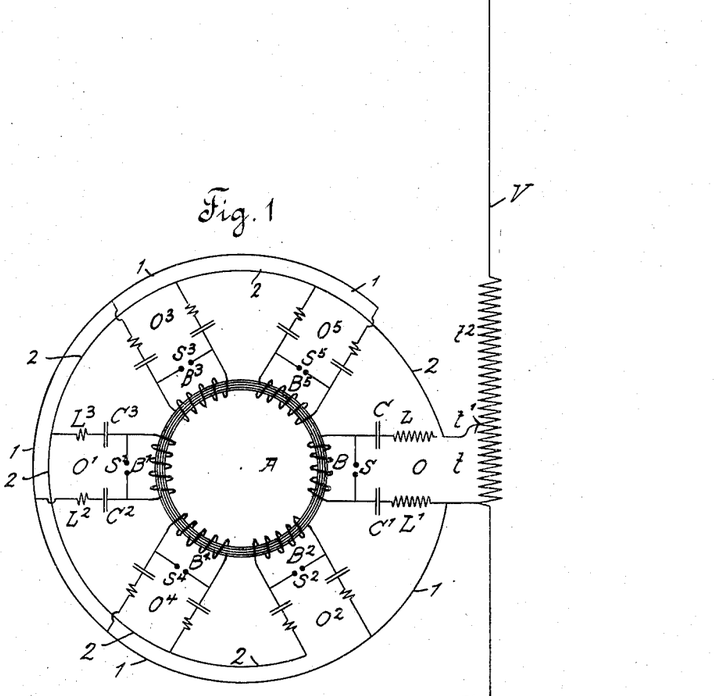
Figures 1, 1ª, and 3 diagrammatically illustrate various forms of my invention.
Figure 1A:
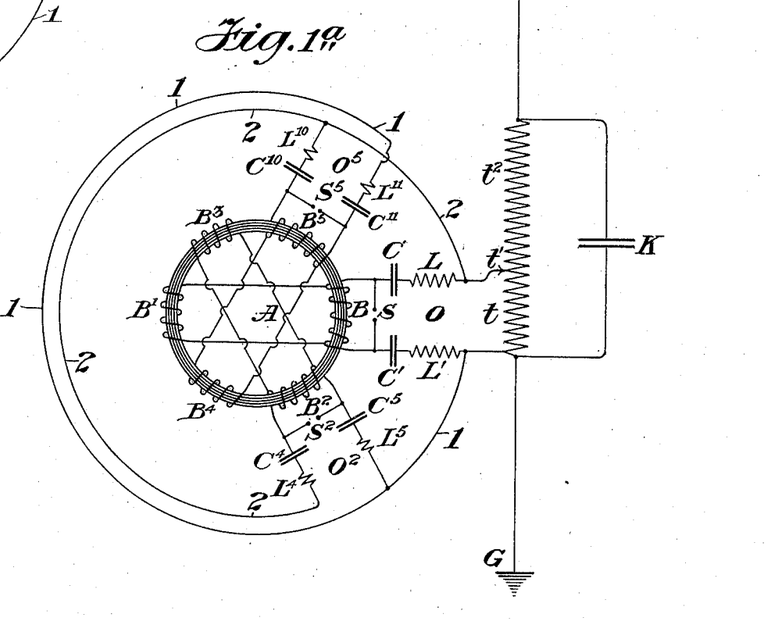
Figure 2:
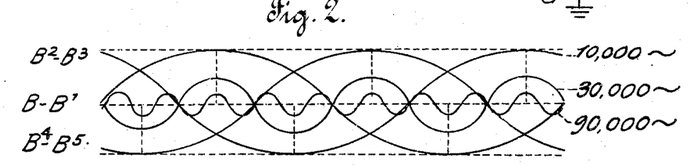
Figs. 2 and 4 are diagrams indicative of the phase relations of Figs. 1, 1ª, and 3 respectively.

In Fig. 1 I have shown an auto-transformer with its primary $t$ in inductive relation with the secondary $t^2$, a ratio adjustment being provided at $t^1$. The consumption circuit in this case is an oscillator grounded at G and provided with an elevated area V such as is commonly used in wireless telegraphy. This oscillator is tuned to the frequency of SO preferably by making its electrical length equivalent to ¼ of the length of a wave of that frequency.

With the apparatus of Fig. 1 I may attain my object of uniform continuous high frequency alternating current quite perfectly, or I may arrange matters to produce any desired approximation of continuity or uniformity. This will be quite evident by reference to Fig. 2 wherein the phase relations of the voltages in the coils are indicated by the elemental or component curves B—B¹, B²—B³ and B⁴—B⁵. With this 3-phase relation of voltage having a frequency of 10,000, I may bring in a fresh supply of energy by condenser discharge every half wave or half cycle of the higher frequency by tuning the oscillatory circuits SO, S¹O¹, etc., to a periodicity three times that of the rotating field. It will be understood that discharges at the rate of ninety thousand per second, as indicated in Fig. 2, are above the limit of audibility, and that the sound heard in a telephone used as an indicating instrument at the receiving station, will be the sound of interruptions or variations of radiation representing the signal. With a lower periodicity for the multiphase generator and with a higher frequency for the oscillatory circuit, the adjustment of the spark gap is preferably such as to preserve the discharge frequency above the limit of audibility. If a higher periodicity is desired, said oscillatory circuits SO, S¹O¹, etc., may be tuned to a frequency 9 times that of the generator, in which case the oscillations will be reinforced in phase by fresh condenser discharge every wave and a half. Similarly SO may be tuned to a frequency 15 or 21 times that of the rotating field where much higher frequencies are desirable and the condenser discharges will always be in phase, but the number of alternations in between will, of course, increase proportionally. In proportioning and adjusting the time period of the discharge circuit, the rate of supply of charging energy, and the breaking down voltage of the discharge device, to get the special conditions indicated in the diagrammatic views, it will be found that more than one discharge per half cycle of each phase of the generator may be produced; but multiple discharges per half cycle are often desirable and may be used to advantage. They may be made most numerous where the oscillatory frequency is a high multiple of the generator frequency, or where the wave is flat topped, as hereinafter mentioned in connection with Fig. 2.

It will be obvious to any one skilled in the art that the circuits of the coils are to a certain extent independent, the essential interdependent relation being one of time. If the frequency and phase relations of Fig. 2, for instance, are attained, it is comparatively unimportant whether it is by coils of one and the same rotating field or not. For instance, three similar alternating generators mounted in proper angular relation on a single shaft, or otherwise synchronously rotated in proper angular relation, would answer the purpose. In such case it would be possible to have such generators suitable different odd multiples of one frequency instead of having them of the same frequency.

Figure 3:
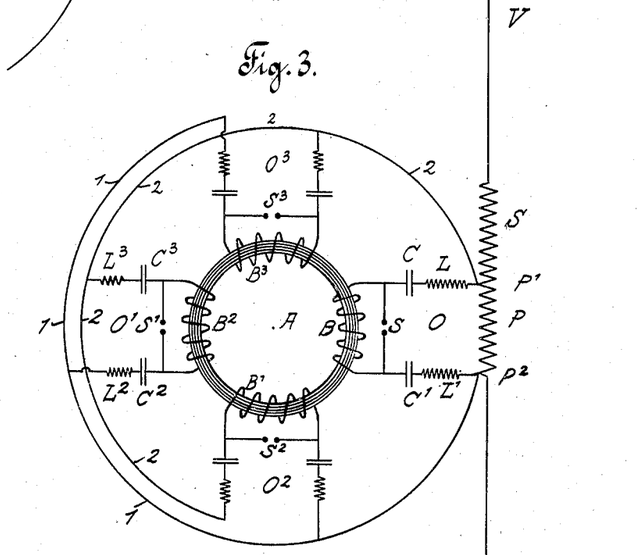
Figure 4:
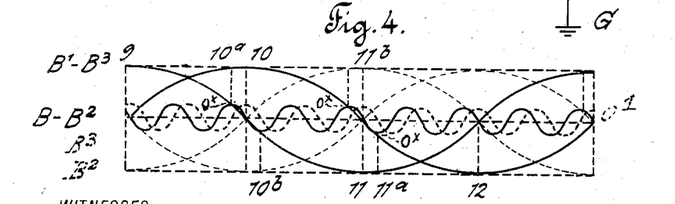

With the preferred arrangement, the secondary circuit, which is to be supplied, may serve as a synchronizer or regulator, particularly if it be itself a persistent oscillator. It oscillates in the periods of the higher frequency and reacting on its primary in exact phase it serves to determine the instant of maximum charge of the condensers as exactly coincident with both the crest of a prime wave and the crest of an oscillatory wave. This steadying effect may be so great that where, as in Fig. 3, only two pairs of coils are used and they are in quadrature so that no oscillation or continuous alternating frequency can be found whereof the crests of oscillations will coincide with all of the crests of the prime energy wave, nevertheless the instant of maximum potential on the condensers may be determined as coinciding with the crests of oscillations rather than with the exact crests of the prime waves. This is illustrated in Fig. 4 wherein B¹B³ and BB² indicate the phase relations of the rotating field coils. By trial it will be found that there is no oscillation frequency which will give crests in phase with the exact crest of curve B¹B³ at 9 and BB² at 10 and yet be in phase with B¹B³ at the other crest 11 and BB² at the other crest 12. In general it will be found that an even multiple of the prime frequency as O will be in phase at the two adjacent crests on the same side of the ordinate but will be out of phase with the next two crests on the other side of the ordinate. An odd multiple will be in phase with all crests of BB² and exactly out of phase with all crests of B¹B³. Nevertheless if the secondary circuit be a very persistent oscillator it will serve to determine the instant of maximum potential on the condensers at the crests of the condenser oscillation as shown at O¹. The reason of this is that the maximum potential of O¹ at the instant corresponding to 10ᵃ added to the potential of BB² at the instant will be greater than the potential of BB² alone at instant 10 and similarly the potential of O¹ plus the potential of B¹, B³ at instant 11ᵃ will be greater than the potential at instant 11. This slight shifting of the instant of sparking from the instant of maximum potential of the prime voltage may be facilitated by so designing that the prime wave will be comparatively flat topped.

Where the secondary circuit is a good oscillator or where the energy is not transferred too rapidly from the condenser circuits to the secondary the principle explained in connection with Figs. 3 and 4 may be applied in a specifically different way. That is to say, the coils $BB^1$, etc., may be connected in opposite phase to the primary $t$ of the transformer as indicated in dotted lines on Fig. 4 and the maximum potential on the condenser of circuit of coil $B^3$ will occur at instant $10^b$ at the crest of a wave of oscillation $O^x$ and not exactly at the crest of $B^3$ but a little later. The reason is as before namely that the potential of $B^3$ at instant $10^b$ is the potential of a crest of $O^x$ plus the potential of $B^3$ a short time before or after the crest and this sum is considerably greater than the potential of $B^3$ alone even at the exact crest 10. Similarly the potential at instant $11^a$ being that of crest $O^x$ plus that of $BB^2$ is greater than $BB^2$ at crest 11.

With an odd number of coils or with an odd number of pairs of coils as in Fig. 1 exact synchronism of phase may always be attained even with a sharp wave. For instance with 5 pairs of coils the frequency of BO should be either 5 or 15 times A according as a prime condenser discharge is desired every half wave, or every wave and a half. So for 7 pairs of coils the frequency of BO should be 7 or 21 times that of A; for 9 pairs of coils 9 or 27; etc. For a greater number of waves between prime condenser discharges matters may be arranged by selecting suitable odd multiples of the above numbers as 45, 63, 81, etc., respectively. In the practice of wireless telegraphy, however, intervals between discharges greater than one and a half waves are not desirable. This will be evident from the fact that both selectivity and power effects in the receiver may be greatly improved by resonance and good resonance effects are impossible unless a considerable number of oscillations succeed each other continuously and synchronously. Otherwise the energy is dissipated before it has time to build up and accumulate. So far as can be determined the number necessary to good results is not less than ten or twelve waves. It is also desirable the largest possible amount of energy be radiated in each wave. A good transmitting capacity area will radiate a very large fraction of the energy supplied to it in about a wave and a half and for that reason fresh condenser charges should supply energy at intervals not greater than this. Another factor in wireless telegraphy is the fact that the practicable height of grounded radiating wires is limited and that the frequencies of which the practicable aerial is a quarter wave length is high; that is of the order of 1,000,000. Another factor is that the speed of rotation of the generator field A is limited by practical conditions as is also the number of pairs of coils $BB^1$. With these various considerations as factors I preferred in some cases to limit rotations of field to about 10,000 and the number of coils or pairs of coils and the corresponding phases from $BB^1$ $B^2$, etc., to three or five. Among other things this limits the number of circuits BO SO etc. to be tuned. I also prefer to arrange for a fresh condenser discharge every wave and a half. This with three phases as in Fig. 2 gives a frequency of 90,000 on the primary. This frequency is again raised by means shown in Fig. 5.

Figure 5:
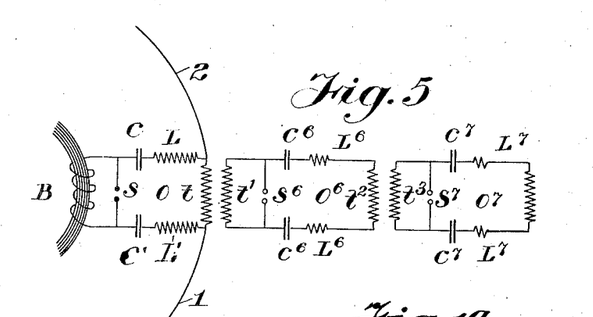
Figs. 5 and 6 are diagrammatic views illustrating means for multiplying frequencies, said means being shown as applied to the frequencies produced in the apparatus of Figs. 1, 1ª, and 3.

In Fig. 5 the secondary $t'$ of transformer $t$ is part of a circuit exactly similar to BO, SO except that $t^1O^6$ is tuned to 90,000 and $S^6O^6$ is tuned to an odd multiple of that frequency or preferably 270,000. This latter circuit is in turn a primary to supply currents of 270,000 frequency to a third circuit $t^3O^7$, $S^7O^7$ of the same type tuned correspondingly. That is to say, $t^3O^7$ is tuned to 270,000 and $S^7O^7$ to 180,000. In each of the latter circuits the condenser discharge frequency is three times the charging frequency and a prime condenser discharge comes in every wave and a half. Thus from the rotating field to the aerial, there is no point in all the steps of frequency from 10,000 to 810,000 where the alternating energy is not maintained practically continuous by fresh prime discharges at intervals in no case greater than a wave and a half.

Figure 6:
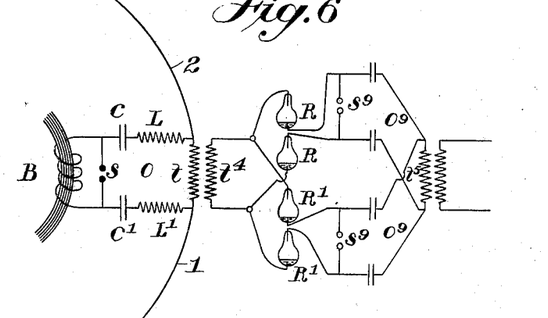

If it is desirable that the frequency be doubled instead of tripled the arrangement $t^4O^9$ of Fig. 6 may be substituted for one or more of the circuits $t^1$, $O^6$, $t^3$, $O^7$ in one direction only. This is accomplished by arranging asymmetric resistances or valves RR in the leads of one condenser circuit and $R^1R^1$ in the other. These may be vapor tubes as diagrammatically indicated. The two circuits $S^9O^9$ $S^9O^9$ are tuned to twice the frequency of $t^4$ and by this means each half wave becomes a complete wave or waves of twice the primary frequency. The two sets of oscillations may be used separately or may be connected in phase to a common winding as shown at $t^5$. When used separately the vapor tubes R, $R^1$ are necessary only in one side of the condenser circuits.

As shown in Fig. 1$^a$, a condenser may be placed in shunt to the transformer winding and so adjusted as to give this circuit the same periodicity as that of the vertical or sending conductor.

The word "multiphase" is used herein to include 2-phase, 3-phase, as well as phases of greater number.

While practically perfect continuity and uniformity of the high frequency currents illustrated in Figs. 2 and 4 are particularly useful for wireless telegraphy and are preferable where sharp tuning is desired, it is nevertheless evident that for some purposes uniformity is not so important as continuity, and that for many purposes neither continuity nor uniformity is essential, provided the cycles of nonuniformity or discontinuity follow each other at a rate too high for audibility, or, more accurately stated, at a frequency higher than the frequencies which the telephone or other receiver is able to translate into sensible indications or effects. With such frequencies listening in with the telephone is impossible. Thus, high frequency irregularities may be for many purposes practically useful approximations of continuity and uniformity. It follows that it is not always necessary to have the high frequency current an exact multiple of the generator frequency, especially where the high frequency is much higher than that of the generator.

In applicant's case Serial Number 276,487, filed August 31st, 1905, which is a division of the present application, claims are made upon certain features of the present invention.

I claim as my invention:

1. The combination with a plurality of oscillatory circuits of the same periodicity and means for charging said circuits, of means whereby said circuits are discharged successively.

2. The combination with a plurality of oscillatory circuits of the same periodicity and means for charging said circuits independently of means whereby said circuits are discharged according to a predetermined time relation.

3. The combination with a plurality of circuits of the same frequency, each circuit including a capacity and a discharge device, of means for charging said circuits up to the voltage of discharge successively.

4. The combination with a plurality of circuits of the same frequency, each circuit including a capacity and a discharge device, of means for charging said circuits up to the voltage of discharge successively according to a predetermined time relation.

5. The combination with a plurality of oscillatory circuits and means for charging said circuits, of means adapted to discharge said circuits successively, the discharge periodicity of each of said circuits being a multiple of the periodicity of the charging voltage.

6. The combination with a plurality of oscillatory circuits and means for charging said circuits, of means adapted to discharge said circuits according to a predetermined time relation, the discharge periodicity of each of said circuits being a multiple of the periodicity of the charging voltage.

7. The combination with a plurality of circuits including a capacity and a discharge device, of means for charging said circuits up to the voltage of discharge successively, the discharge periodicity of each of said circuits being a multiple of the periodicity of the charging voltage.

8. The combination with a plurality of circuits including a capacity and a discharge device, of means for charging said circuits up to the voltage of discharge successively, the discharge periodicity of each of said circuits being a multiple of the periodicity of the charging voltage.

9. The combination with a plurality of oscillatory circuits and means for charging said circuits, of means adapted to discharge said circuits successively, the discharge periodicity of each of said circuits being a multiple of the periodicity of the charging voltage, an electrical conductor and means for causing the discharges of said circuits to energize said conductor.

10. The combination with a plurality of oscillatory circuits and means for charging said circuits, of means adapted to discharge said circuits according to a predetermined time relation, the discharge periodicity of each of said circuits being a multiple of the periodicity of the charging voltage, an electrical conductor and means for causing the discharges of said circuits to energize said conductor.

11. The combination with a plurality of circuits including a capacity and a discharge device, of means for charging said circuits up to the voltage of discharge successively, the discharge periodicity of each of said circuits being a multiple of the periodicity of the charging voltage.

12. The combination with a plurality of circuits including a capacity and a discharge device, of means for charging said circuits up to the voltage of discharge successively, the discharge periodicity of each of said circuits being a multiple of the periodicity of the charging voltage, an electrical conductor and means for causing the discharges of said circuits to energize said conductor.

13. The combination with a plurality of circuits each including a capacity and a discharge device, of means for charging each of said circuits to the discharge point with alternating voltages according to a regular multiphase time relation, the discharge periods of said circuits being a multiple of the charging frequency.

14. The combination with a plurality of circuits each including a capacity and a discharge device, of means for charging each of said circuits to the discharge point with alternating voltages according to a regular multiphase time relation.

15. The combination of a plurality of prime circuits energized by alternating voltages of the same frequency but dephased equi-angular amounts and a plurality of circuits each including a capacity and a discharge device each energized by one of said prime circuits, the discharge periodicity of said capacity circuits being the same and a multiple of the frequency of the prime circuits, in combination with coil or winding and connections therewith from all said capacity circuits whereby said winding is continuously energized alternately synchronously and in phase by successive discharges and synchronous oscillations of all said capacity circuits.

16. A coil or winding and means for energizing the same with alternating voltages, in combination with a connected circuit containing a capacity resonant with said winding to the frequency of the alternating voltage and a discharge device across said capacity the discharge circuit being tuned to a frequency which is a multiple of the frequency of the charging voltage.

17. A coil or winding and means for energizing the same with alternating voltages, in combination with a connected circuit containing a capacity resonant with said winding to the frequency of the alternating voltage and a discharge device across said capacity the discharge circuit being tuned to a frequency which is an odd multiple of the frequency of the charging voltage.

18. A winding or coil energized by alternating voltages and a condenser circuit in combination with means for permitting charging thereof in one direction only, and a discharge device across said condenser the discharge circuit being tuned to an even multiple of the frequency of the discharging circuit.

19. A winding energized by alternating voltages, two condenser circuits, means for permitting each to be energized in opposite directions and each in one direction only, and a discharge device across each condenser, each condenser circuit being tuned to an even multiple of the frequency of the alternating voltages, in combination with a coil and connections whereby the said coil is energized in phase by both said discharge circuits.

20. A plurality of condenser discharge circuits tuned to the same frequency and means for charging the same periodically, in combination with a persistently oscillating circuit in operative connection with all of said circuits and tuned to the same frequency.

21. A plurality of condenser discharge circuits tuned to the same frequency and a rotating field generator for charging the same periodically in combination with a persistently oscillating circuit in operative connection with all of said circuits and tuned to the same frequency.

22. A plurality of circuits, including a capacity and a discharge device, in combination with a rotating field generator for charging said circuits up to the voltage of discharge successively, an electrical conductor and means for causing the discharges of said circuits to energize said conductor.

23. A plurality of similar oscillatory circuits and a rotating field generator for charging said circuit, in combination with means adapted to discharge said circuits successively, the discharge periodicity of each of said circuits being a multiple of the periodicity of a generator, an electrical conductor and means for causing the discharges of said circuits to energize said conductor.

24. A plurality of oscillatory circuits and a rotating field generator for charging said circuits in combination with means adapted to discharge said circuits according to a predetermined time relation, the discharge periodicity of each of said circuits being a multiple of the periodicity of the charging voltage, and electrical conductor and means for causing the discharges of said circuits to energize said conductor.

25. A plurality of circuits including a capacity and a discharge device in combination with a rotating field generator for charging said circuits up to the voltage of discharge successively, the discharge periodicity of each of said circuits being a multiple of the periodicity of the charging voltage.

26. A plurality of circuits including a capacity and a discharge device in combination with a rotating field generator for charging said circuits up to the voltage of discharge successively, the discharge periodicity of each of said circuits being a multiple of the periodicity of the charging voltage, an electrical conductor and means for causing the discharges of said circuits to energize said conductor.

27. A plurality of circuits each including a capacity and a discharge device in combination with a rotating field generator for charging each of said circuits to the discharge point with alternating voltages according to a regular multi-phase relation, the discharge periods of said circuits being a multiple of the charging frequency.

28. In a wireless signaling system, the combination of a sending circuit and means for energizing it from a source of multiphase alternating current of low frequency.

29. In a wireless signaling system, a sending circuit in combination with a multiphase alternating current source and connections whereby the sending circuit may be energized by every half cycle of each phase of said multiphase source.

30. A consumption circuit, in combination with a source of multiphase alternating currents of low frequency, and connections for energizing said consumption circuit an odd number of times for each half cycle of each phase of said alternating current.

31. A consumption circuit, in combination with a source of multiphase alternating currents of low frequency and connections whereby said consumption circuit is energized by a plurality of fluxes in opposite directions for each half cycle of each phase of said multiphase currents.

32. A consumption circuit, in combination with a source of multiphase alternating currents having an odd number of phases, and connections for energizing said consumption circuit an odd number of times for each half cycle of each phase of said alternating current.

33. A circuit, tuned or resonant to a high frequency, in combination with a source of multiphase alternating current of lower frequency and connections whereby said tuned or resonant circuit is energized by a plurality of alternating fluxes for each half cycle of each phase of said multiphase currents.

34. An oscillatory circuit tuned or resonant to a desired frequency, in combination with a source of multiphase alternating currents of lower frequency, and connections for reinforcing the oscillations of said tuned or resonant circuit at each half cycle of each phase of said alternating current from said multiphase source.

35. An oscillatory circuit tuned or resonant to a desired frequency, in combination with a source of multiphase alternating currents of lower frequency and connections whereby the oscillations of said tuned or resonant circuit are reinforced in phase by a plurality of fluxes in opposite directions, for each half cycle of each phase of the currents from said multiphase source.

36. A high frequency circuit, in combination with means for generating a plurality of alternating supply currents or voltages, and for applying the energies of each of said supply currents to said first mentioned circuit according to a multiphase time relation, whereby the fresh supplies of energy of one supply current occur during periods of least supply of the other supply current.

37. A high frequency circuit in combination with means for generating a plurality of alternating supply currents or voltages of relatively low frequency, and for applying the energies of each of said supply currents to said first mentioned circuit according to a multiphase time relation.

38. A high frequency circuit in combination with a source of energy supply therefor, comprising means for generating a plurality of fluctuating currents or voltages varying according to a time relation so predetermined that the periods of efficient energy supply of one of said fluctuating supply currents occur during the periods of smaller supply of another fluctuating supply current, and means for operatively supplying to said consumption circuit energy from each said varying supply currents or voltages during their respective periods of efficient energy supply.

39. A high frequency circuit in combination with a source of energy supply therefor, comprising means for generating a plurality of supply currents or voltages varying according to a time relation so predetermined that the periods of efficient energy supply of one of said supply currents extend substantially throughout the periods of smaller supply of another supply current, and means for operatively supplying to said consumption circuit energy from each of said varying supply currents or voltages during their respective periods of efficient energy supply.

40. A high frequency circuit in combination with a source of energy supply therefor, comprising means for generating a plurality of low frequency supply currents or voltages varying according to a time relation so predetermined that the periods of efficient energy supply of one of said supply currents extend substantially throughout the periods of smaller supply of another supply current, and means for operatively supplying to said consumption circuit energy from each said varying supply currents or voltages during their respective periods of efficient energy supply.

41. In a wireless signaling system, the combination with a sending circuit, of means for supplying a multiphase alternating current to said sending circuit, and a spark gap so adjusted as to produce so high a number of discharges during the several phases as to render any listening with a telephone impossible.

42. In a wireless signaling system, the combination with a sending circuit of means for supplying a multiphase alternating current to said sending circuit, and a spark gap so adjusted that the frequencies of the spark discharge are above the limit of audibility, substantially as and for the purpose described.

43. The combination of an oscillatory main circuit, a number of subsidiary oscillatory circuits, and means for imparting energy to the main circuit through the subsidiary circuits in succession.

44. The combination of an oscillatory main circuit and a plurality of auxiliary oscillatory circuits connected thereto, and means for charging and discharging the auxiliary circuits in orderly sequence.

45. The combination of a closed oscillatory main circuit and a plurality of auxiliary oscillatory circuits connected thereto, and means for charging and discharging the auxiliary circuits in orderly sequence.

46. The combination of an oscillatory main circuit, a number of subsidiary oscillatory circuits, and means for imparting energy to the main circuit through the subsidiary circuits in succession whereby the main circuit is caused to oscillate continuously.

Signed at New York, in the county of New York, and State of New York, this 30th day of June, A. D. 1904.

PETER COOPER HEWITT.

Witnesses:
GEORGE H. STOCKBRIDGE,
WM. H. CAPEL.